US006515404B1

(12) United States Patent
Wong

(10) Patent No.: US 6,515,404 B1
(45) Date of Patent: Feb. 4, 2003

(54) BENDING PIEZOELECTRICALLY ACTUATED LIQUID METAL SWITCH

(75) Inventor: Marvin Glenn Wong, Woodland Park, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/076,679

(22) Filed: Feb. 14, 2002

(51) Int. Cl.$^{7}$ ................................................ H01G 41/08

(52) U.S. Cl. ........................ 310/328; 310/363; 310/365

(58) Field of Search ................................ 310/328, 363, 310/365

(56) References Cited

U.S. PATENT DOCUMENTS 4,200,779 A * 4/1980 Zakurdaev et al. ......... 200/187
4,238,748 A * 12/1980 Goullin et al. ................ 335/56
6,323,447 B1 * 11/2001 Kondoh et al. ............. 200/182
6,396,371 B2 * 5/2002 Streeter et al. ............... 335/78

* cited by examiner

*Primary Examiner*—Thomas M. Dougherty
(74) *Attorney, Agent, or Firm*—Regan L. Trumper

(57) ABSTRACT

In accordance with the invention, a piezoelectrically actuated relay that switches and latches by means of a liquid metal is disclosed. The relay operates by means of a plurality of bending mode piezoelectric elements used to cause a pressure differential in a pair of fluid chambers. The piezoelectric elements act upon a membrane which in turn acts upon a fluid which fills the chambers. The differential pressure causes the liquid metal drop to overcome the surface tension forces that would hold the bulk of the liquid metal drop in contact with the contact pad or pads near the actuating piezoelectric element. The switch latches by means of surface tension and the liquid metal wetting to the contact pads.

28 Claims, 6 Drawing Sheets

BENDING PIEZOELECTRICALLY ACTUATED LIQUID METAL SWITCH

BACKGROUND

Piezoelectric materials and magnetostrictive materials (collectively referred to below as "piezoelectric materials") deform when an electric field or magnetic field is applied. Thus piezoelectric materials, when used as an actuator, are capable of controlling the relative position of two surfaces.

Piezoelectricity is the general term to describe the property exhibited by certain crystals of becoming electrically polarized when stress is applied to them. Quartz is a good example of a piezoelectric crystal. If stress is applied to such a crystal, it will develop an electric moment proportional to the applied stress.

This is the direct piezoelectric effect. Conversely, if it is placed in an electric field, a piezoelectric crystal changes its shape slightly. This is the inverse piezoelectric effect.

One of the most used piezoelectric materials is the aforementioned quartz. Piezoelectricity is also exhibited by ferroelectric crystals, e.g. tourmaline and Rochelle salt. These already have a spontaneous polarization, and the piezoelectric effect shows up in them as a change in this polarization. Other piezoelectric materials include certain ceramic materials and certain polymer materials. Since they are capable of controlling the relative position of two surfaces, piezoelectric materials have been used in the past as valve actuators and positional controls for microscopes. Piezoelectric materials, especially those of the ceramic type, are capable of generating a large amount of force. However, they are only capable of generating a small displacement when a large voltage is applied. In the case of piezoelectric ceramics, this displacement can be a maximum of 0.1% of the length of the material. Thus, piezoelectric materials have been used as valve actuators and positional controls for applications requiring small displacements.

Two methods of generating more displacement per unit of applied voltage include bimorph assemblies and stack assemblies. Bimorph assemblies have two piezoelectric ceramic materials bonded together and constrained by a rim at their edges, such that when a voltage is applied, one of the piezoelectric materials expands. The resulting stress causes the materials to form a dome. The displacement at the center of the dome is larger than the shrinkage orexpansion of the individual materials. However, constraining the rim of the bimorph assembly decreases the amount of available displacement. Moreover, the force generated by a bimorph assembly is significantly lower than the force that is generated by the shrinkage or expansion of the individual materials.

Stack assemblies contain multiple layers of piezoelectric materials interlaced with electrodes that are connected together. A voltage across the electrodes causes the stack to expand or contract. The displacements of the stack are equal to the sum of the displacements of the individual materials. Thus, to achieve reasonable displacement distances, a very high voltage or many layers are required. However, conventional stack actuators lose positional control due to the thermal expansion of the piezoelectric material and the material(s) on which the stack is mounted.

Due to the high strength, or stiffness, of piezoelectric material, it is capable of opening and closing against high forces, such as the force generated by a high pressure acting on a large surface area. Thus, the high strength of the piezoelectric material allows for the use of a large valve opening, which reduces the displacement or actuation necessary to open or close the valve.

With a conventional piezoelectrically actuated relay, the relay is "closed" by moving a mechanical part so that two electrode components come into electrical contact. The relay is "opened" by moving the mechanical part so that the electrode components are no longer in electrical contact. The electrical switching point corresponds to the contact between the electrode components of the solid electrodes.

Liquid metal micro switches have been developed that use liquid metal as the switching element and the expansion of a gas when heated to actuate the switching function. The liquid metal has some advantages over other micromachined technologies, such as the ability to switch relatively high power (approximately 100 mW) using metal-to-metal contacts without microwelding, the ability to carry this much power without overheating the switch mechanism and adversely affecting it, and the ability to latch the switching function. However, the use of a heated gas to actuate the switch has several disadvantages. It requires a relatively large amount of power to change the state of the switch, the heat generated by switching must be rejected effectively if the switch duty cycle is high, and the actuation speed is relatively slow, i.e., the maximum switching frequency is limited to several hundred Hertz.

SUMMARY

The present invention uses a piezoelectric method to actuate liquid metal switches. The actuator of the invention uses piezoelectric elements in a bending mode rather than in a shear mode. A piezoelectric driver in accordance with the invention is a capacitive device which sores energy rather than dissipating energy. As a result, power consumption is much lower, although the required voltages to drive it may be higher. Piezoelectric pumps may be used to pull as well as push, so there is a double-acting effect not available with an actuator that is driven solely by the pushing effect of expanding gas. Reduced switching time results from use of piezoelectric switches in accordance with the invention.

A piezoelectrically actuated liquid metal switch in accordance with the invention is comprised of a plurality of layers. Liquid metal is contained within a channel in one layer and contacts switch pads on a circuit substrate. The amount and location of the liquid metal in the channel is such that only two pads are connected at a time. The metal is movable so that it contacts the center pad and either end pad by creating an increase in pressure between the center pad and the first end pad such that the liquid metal breaks and part of it moves to connect to the other end pad. A stable configuration results due to the latching effect of the liquid metal as it wets to the pads and is held in place by surface tension.

An inert and electrically nonconductive liquid fills the remaining space in the switch. The pressure increase described above is generated by the motion of a piezoelectric pump or pumps. The type of pump of the invention utilized the bending action of piezoelectric elements on a membrane to create positive and negative volume changes. These actions may cause pressure decreases, as well as increases, to assist in moving the liquid metal.

DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION OF THE INVENTION

Figure 1:
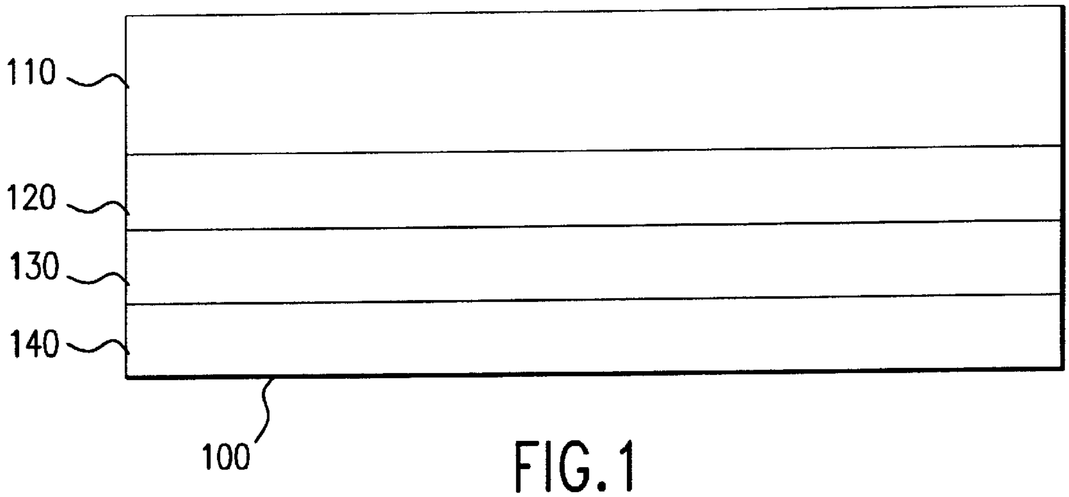
FIG. 1 shows a side view of the layers of a piezoelectric metal switch in accordance with the invention.

FIG. 1 is a side view of an embodiment of the invention showing four layers of a relay 100. The top layer 110 is an actuator fluid reservoir layer and acts as a reservoir for fluid used in the actuator. The second layer 120 is a piezoelectric layer which houses a piezoelectric switching mechanism. The third layer 130 is a liquid metal channel layer and houses a liquid metal used in the switching mechanism. The substrate layer 140 acts as a base and provides a common foundation for a plurality of circuit elements that may be present.

Figure 2:
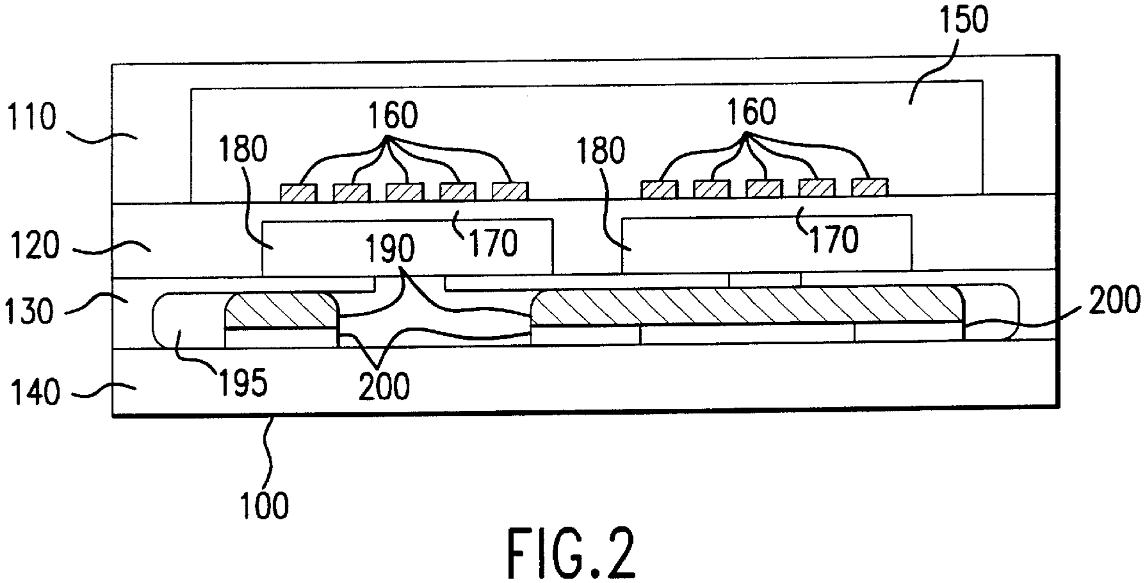
FIG. 2 shows a side cross section of a side view of the layers of a piezoelectric switch in accordance with the invention.

FIG. 2 shows a cross sectional view of an embodiment of an actuator 100 in accordance with the invention. FIG. 2 is also a cross sectional view of FIG. 1. The actuator fluid reservoir layer 110 has a chamber 150 that houses a plurality of piezoelectric elements 160 utilized the relay 100. The chamber 150 also contains a volume of actuator fluid. The actuator fluid is an inert, electrically nonconductive fluid. This fluid is preferably a low viscosity inert organic liquid such as a low molecular weight perfluorocarbon such as is found in the 3M line of Fluorinert products. It may alternatively consist of a light mineral or synthetic oil, for example. The piezoelectric elements 160 are grouped into two sets. It is understood by those skilled in the art that the grouping of the piezoelectric elements 160 is a function of the purpose of the actuator 100. Accordingly, the grouping of the piezoelectric elements 160 may result in multiple sets equaling more than two.

Each set of piezoelectric elements 160 in FIG. 2 is attached to a membrane 170 which forms a portion of the top of piezoelectric layer 120. In a preferred embodiment of the invention, the membranes 170 are constructed of metal. In other embodiments of the invention, the membranes 170 are constructed of a polymer. In still other embodiments of the invention, the membranes are constructed of any material that exhibits sufficient pliability to flex in response to bending of the piezoelectric elements 160. The membranes 170 are bendable in either an upward or a downward fashion responsive to the piezoelectric elements 160.

The embodiment of the invention shown in FIG. 2, the piezoelectric elements are shown as having been laminated on top, and above, of the piezoelectric layer 120

The membranes 170 also form a barrier between the piezoelectric elements 160 and an actuator fluid chamber 180 located in the piezoelectric layer 120. Two actuator fluid chambers 180 are shown in FIG. 2 separated by a portion of the piezoelectric layer. The actuator fluid chambers 180 are filled with actuator fluid. A gap in the liquid metal layer 130 opposite each set of the piezoelectric elements 160 provides conduits between the fluid chambers 180 and the liquid metal layer 130. The conduits allow fluid flow between the chambers 180 and the liquid metal layer 130.

The liquid metal layer 130 comprises a liquid metal 190 which is contained within a channel 195 and a set of switch contact pads 200 located on the circuit substrate 140. The space in the channel 195 which is not filled with liquid metal 190 is filled with the fluid. The liquid metal is inert and electrically conductive. The amount and location of the liquid metal 190 is such that only two pads 200 are connected at a time. The center pad 200 will always be contacted and either the left or rights pad 200. In the embodiment of the invention shown in FIG. 2, the liquid metal 190 is in contact with the center pad 200 and the right pad 200. The liquid metal 190 is moved to contact the left pad 200 by the bending action of the piezoelectric elements 160.

Bending of the piezoelectric elements 160 causes either an increase or a decrease in chamber 180. In the example shown in FIG. 2, the set of piezoelectric elements on the right bend downward to cause an increase in the right chamber 180. The increase in pressure causes the liquid metal 190 to move leftward until it is contacting the center pad 200 and the left pad 200. The pumping actions of the piezoelectric elements create either a positive or a negative volume, and pressure, change in chambers 180. When the right set of piezoelectric elements 160 causes an increase in pressure—decreased volume—the left side can cause a decrease in pressure—increased volume—by bending upward. The opposite movements of the two sets of piezoelectric elements 160 assist in movement of the liquid metal 200.

The piezoelectric elements 160 may be laminated to the membrane 170 or they may be deposited as thinfilm or thickfilm layers on the membrane 170. FIG. 2 shows sets of five piezoelectric elements 160 on both the right and left side. It is understood by those skilled in the art that the number of piezoelectric elements 160 in each set is variable. As many as one to ten or more piezoelectric elements are possible depending only on the size of each element and the size of the application. The membrane is normally made of metal, although other materials are possible, such as polymers.

In a preferred embodiment of the invention, the liquid metal 190 is mercury. In an alternate preferred version of the invention, the liquid metal is an alloy containing gallium.

In operation, the switching mechanism of the invention operates by bending mode displacement of the piezoelectric elements 160. An electric charge is applied to the piezoelectric elements 160 which causes the elements 160 to bend. As discussed above, the bending action of the piezoelectric elements can be on an individual basis—one set at a time—or in a cooperative manner—both sets together. Downward bending of the piezoelectric elements 160 of one of the sets causes an increase of pressure and decrease of volume in the chamber 180 directly below the downward bending set. This change in pressure/volume causes displacement of the moveable liquid metal 190. To increase the effectiveness, the piezoelectric elements of the other set can bend upward at the same time. Reversing the bending motion of the piezoelectric elements 160 causes the liquid metal 190 to displace in the opposite direction. The piezoelectric elements 160 are relaxed, i.e. the electric charge is removed, once the liquid metal 190 has displaced. The liquid metal 190 wets to the contact pads 200 causing a latching effect. When the electric charge is removed from the piezoelectric elements 160, the liquid does not return to its original position but remains wetted to the contact pad 200.

Figure 3:
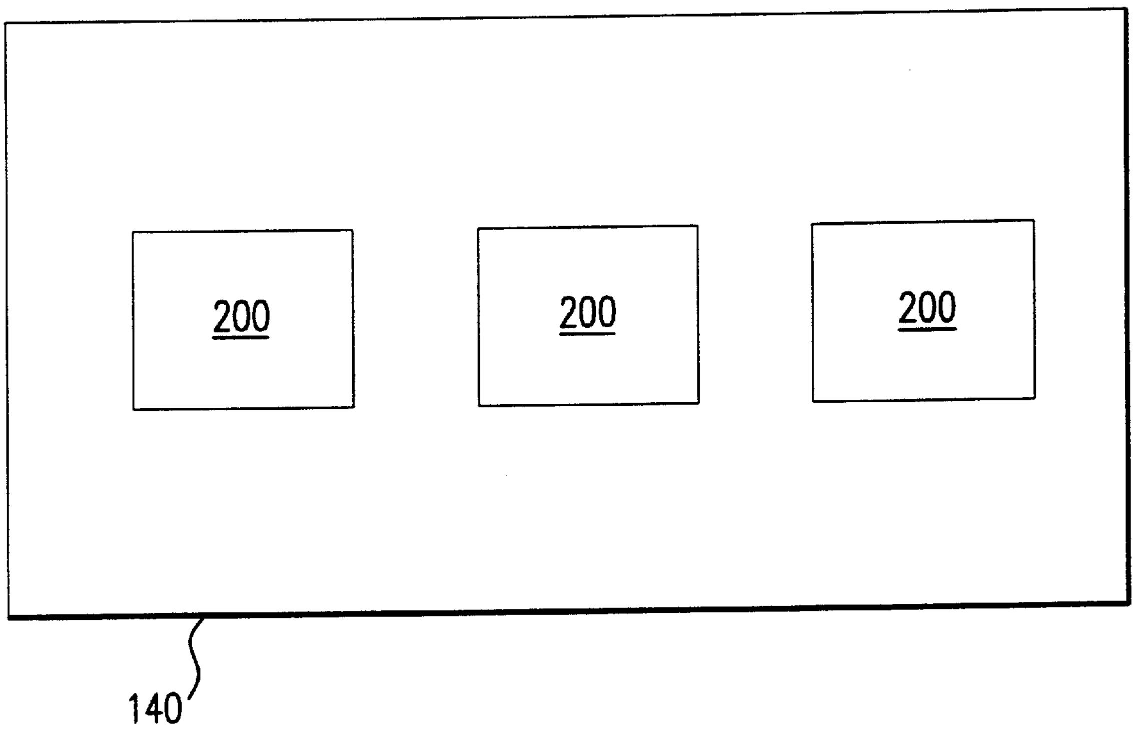
FIG. 3 shows a top level view of the substrate layer with the switch contacts.

FIG. 3 shows a top level view of the substrate layer 140 with the switch contacts 200. The switch contacts 200 can be connected through the substrate 140 to solder balls (not shown) on the opposite side for the routing of signals. It is understood that there are alternatives to routing of signals. For instances, the signal routing can be place in the substrate layer 140. It is also understood that the switch pads 200 in FIG. 2 are merely representative of the switch pads of the invention. Specifically, the substrate layer 140 and the switch pads 200 are not necessarily proportional to the switch pads and substrate layer in FIG. 3.

Figure 4B:
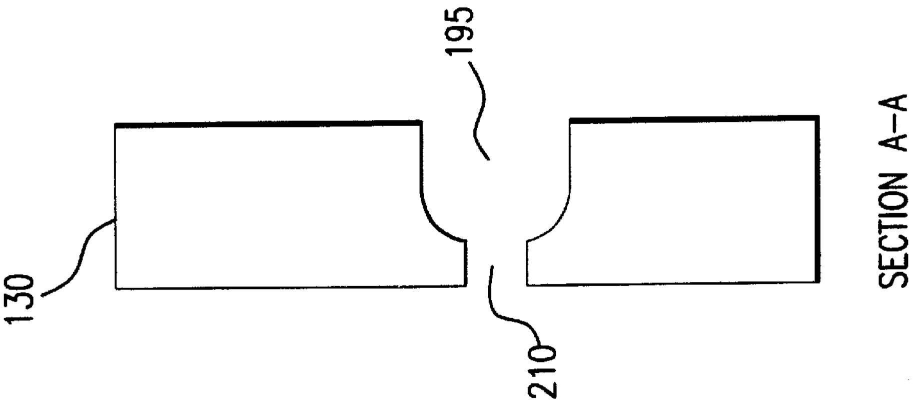
FIG. 4B is a side-sectional view of the liquid metal layer.
Figure 4A:
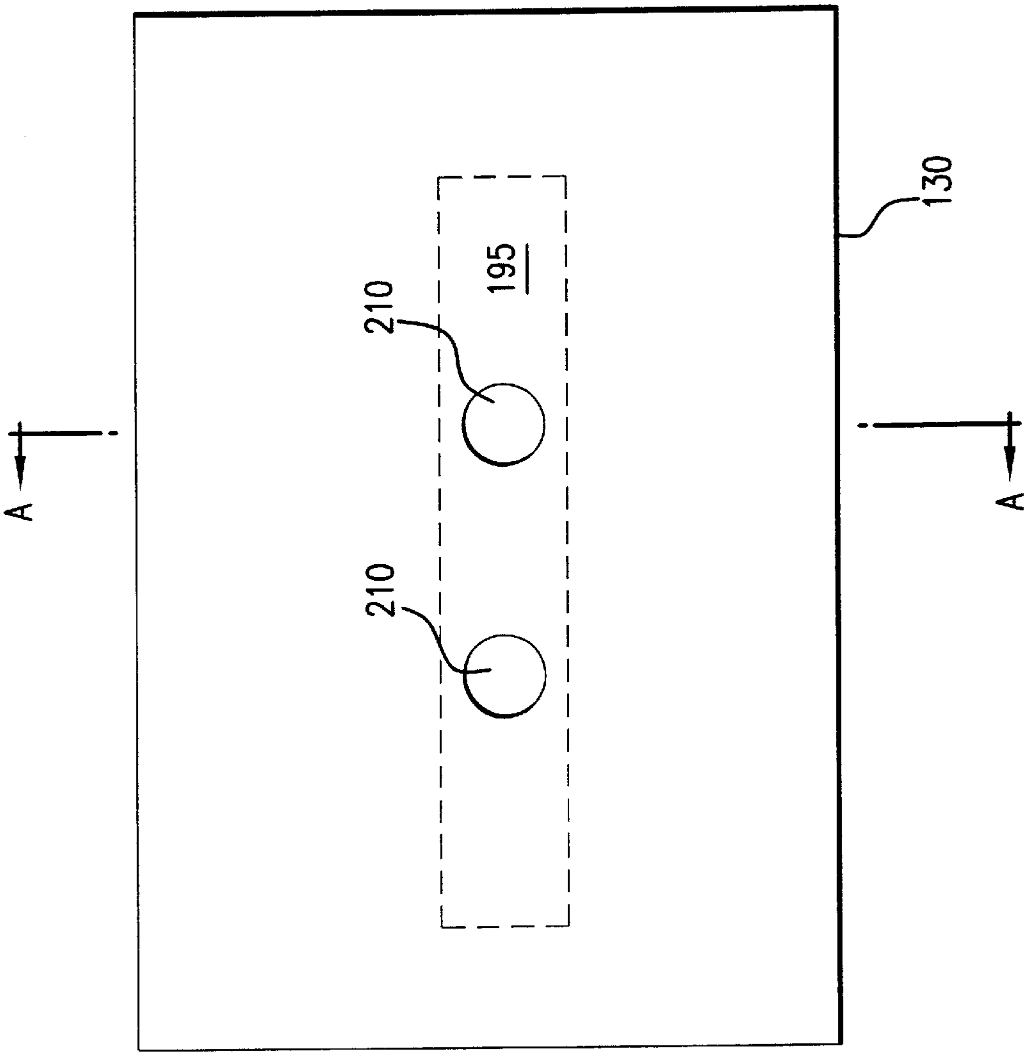
FIG. 4A is a top view of the liquid metal channel layer.

FIG. 4A is a top view of the liquid metal channel layer 120. The liquid metal layer 120 comprises the liquid metal channel 195 and a pair of through-holes 210 which act as the conduits for movement of liquid from the liquid metal channel 195 and the chamber 180 shown in FIG. 2. FIG. 4B is a side-sectional view of the liquid metal layer 120 at the A—A point. The liquid metal channel 195 is shown connecting to the through-hole 210.

Figure 5B:
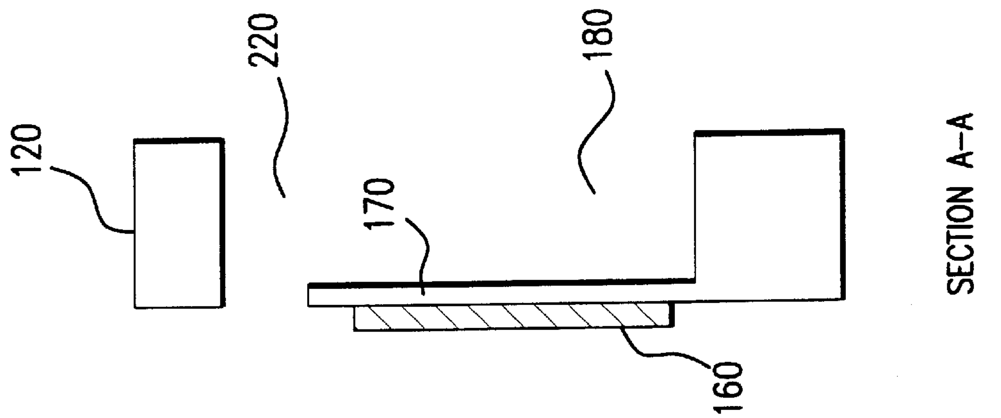
FIG. 5B shows a side-sectional view of the piezoelectric layer.
Figure 5A:
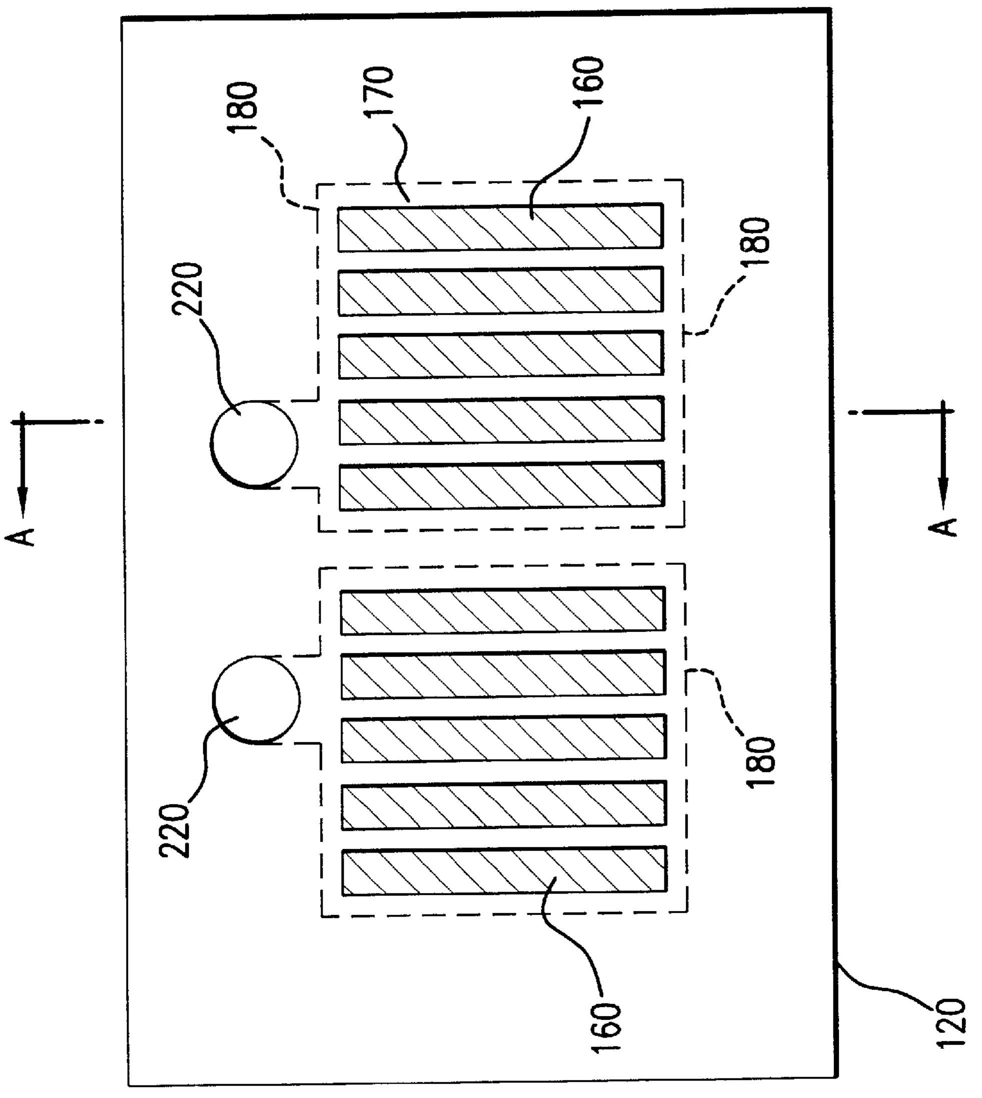
FIG. 5A is a top view of the piezoelectric layer showing two sets of piezoelectric elements.

FIG. 5A is a top view of the piezoelectric layer 120 showing two sets of piezoelectric elements 160. The piezoelectric elements 160 are above the fluid chambers 180 and are affixed to the membrane 170. The fluid chambers 180 connect to fluid flow restrictors 220. The fluid flow restrictors 220 are conduits that connect to the fluid reservoir 150 shown in FIG. 2. The fluid flow restrictor 220 is shown here for purposes of illustration only. It is understood by those skilled in the art that the restrictors 220 that connect the pumping chamber 180 with the fluid reservoir is small and assist in causing the pressure pulse to move the liquid metal by directing most of the fluid flow from the pumping action, of the piezoelectric elements 160 and membrane 170 into the channel 195 rather than into the fluid reservoir.

FIG. 5B shows a side-sectional view of the piezoelectric layer 120 at the point A—A. The piezoelectric elements 160 are affixed to the membrane 170 and above the chamber 180. The chamber 180 connects to the fluid flow restrictor 220.

Figure 6:
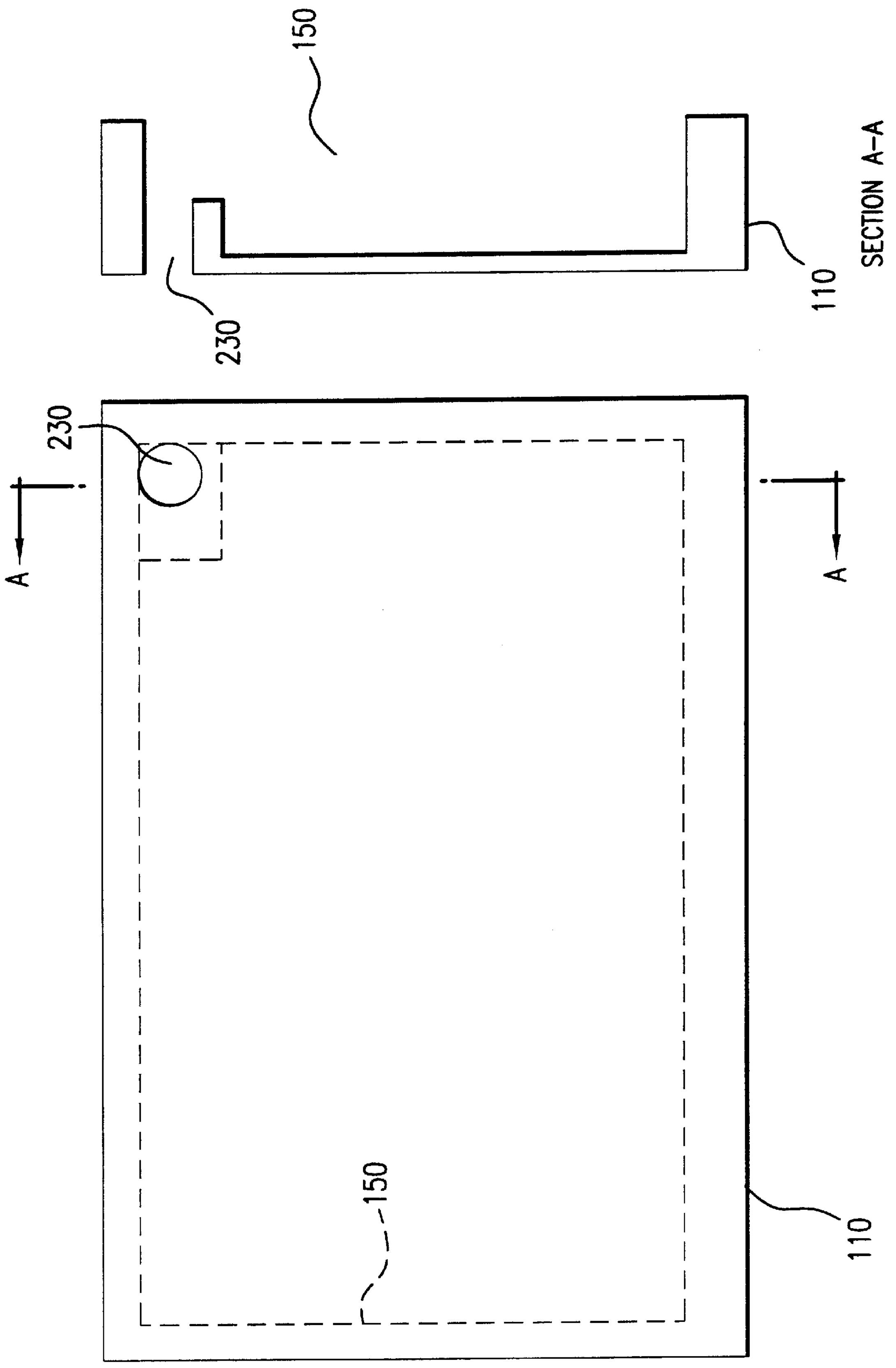
FIG. 6 shows a top view of the actuator fluid reservoir layer.

FIG. 6 shows a top view of the actuator fluid reservoir layer 110 with the reservoir 150 and a fill port 230. The fluid reservoir 150 is illustrated here as a single part in one embodiment of the invention. In an alternate embodiment of the invention, the fluid reservoir is made from multiple sections. The fluid reservoir 150 is a depository of the working fluid and has a compliant wall to keep pressure pulse interactions between pumping elements—crosstalk—to a minimum. The fluid reservoir 150 is filled after the switch assembly 100 has been assembled. The fill port 230 is sealed after the reservoir has been filled.

Figure 7:
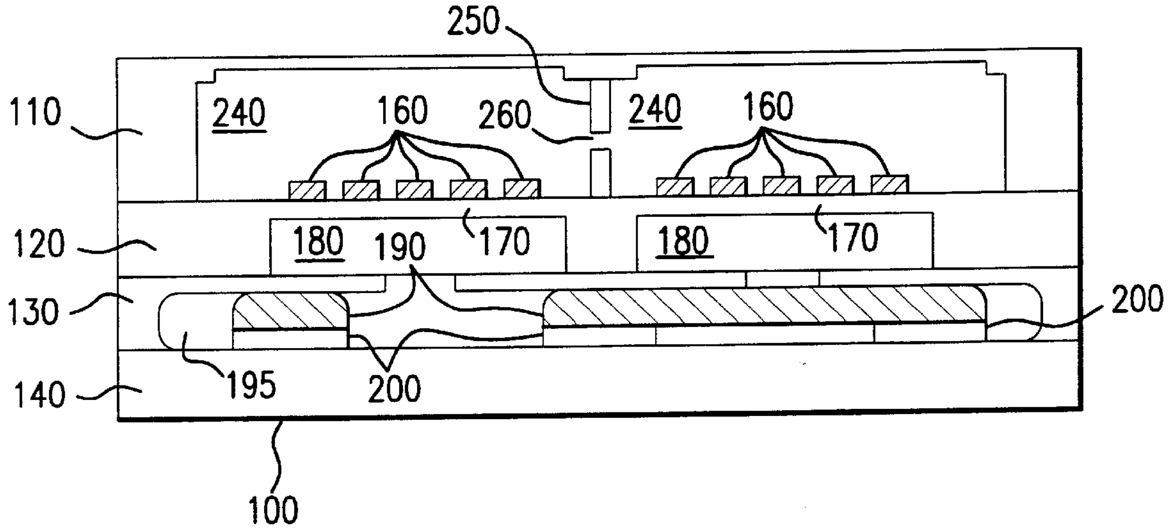
FIG. 7 shows an alternate side cross section of a side view of the layers of a piezoelectric switch in accordance with the invention.

FIG. 7 shows an alternate embodiment of the invention wherein the fluid reservoir comprises multiple compartments 240. The wall 250 separating the multiple compartments has a pressure relief port 260 which connects to both of the compartments 240 which equalizes the pressure between compartments 240, and each of the compartments 240 has a compliant exterior wall which keeps pressure pulse interactions between pumping elements—crosstalk—to a minimum.

While only specific embodiments of the present invention have been described above, it will occur to a person skilled in the art that various modifications can be made within the scope of the appended claims.

What is claimed is:

1. A piezoelectric activated relay comprising:

a liquid metal channel;

a first and second fluid chamber, each of said fluid chambers being connected to said channel via a first and second conduit respectively;

a first and second membrane forming a top to said first and second fluid chambers;

a first, second and third contact pad equally separated from each other, each of said contact pads having at least a portion within the chamber;

a plurality of piezoelectric elements forming a first and a second set of elements with said first set being affixed to said first membrane and said second set being affixed to said second membrane; and a moveable conductive liquid within the channel, a first portion of the liquid being wetted to the first of said contact pads and a portion of the liquid wetted to both the second and third of said contact pads;

wherein said chambers and said channel are filled with a fluid and wherein said portion of the liquid wetted to said second and third of said contact pads is moveable toward said portion wetted to the first of said contact pads.

2. The piezoelectric activated relay of claim 1 further comprising a fluid reservoir which surrounds said plurality of piezoelectric elements wherein said reservoir is connected to said chamber via a first and a second through-hole.

3. The piezoelectric activated relay of claim 2 wherein each of said first set of piezoelectric elements comprises at least two bending mode piezoelectric elements and said second set of piezoelectric elements comprises at least two bending mode piezoelectric elements.

4. The piezoelectric activated relay of claim 3 wherein said fluid reservoir comprises a single compartment.

5. The piezoelectric activated relay of claim 3 wherein said fluid reservoir comprises a plurality of compartments wherein each of said plurality of compartments has compliant walls.

6. The piezoelectric activated relay of claim 5 further comprising a relief port connecting said plurality of compartments.

7. The piezoelectric activated relay of claim 4 wherein said moveable conductive liquid is moveable by pressure differentials created within the first and second fluid chambers caused by activation of at least one set of the piezoelectric elements, said activation of said piezoelectric elements causing said membrane to bend.

8. The piezoelectric activated relay of claim 4 wherein said moveable conductive liquid is moveable by pressure differentials created within the first and second fluid chambers caused by activation of both the first and second set of the piezoelectric elements cooperatively with each other, said activation of said piezoelectric elements causing said membrane to bend.

9. The piezoelectric activated relay of claim 3 wherein said membrane is metal.

10. The piezoelectric activated relay of claim 3 wherein said membrane is a polymer.

11. The piezoelectric activated relay of claim 9 wherein said liquid metal is mercury.

12. The piezoelectric activated relay of claim 9 wherein said liquid metal is an alloy containing gallium.

13. The piezoelectric activated relay of claim 10 wherein said liquid metal is mercury.

14. The piezoelectric activated relay of claim 10 wherein said liquid metal is an alloy containing gallium.

15. The piezoelectric activated relay of claim 10 further comprising a fill port situated above said fluid reservoir.

16. A piezoelectric activated relay comprising:

a fluid reservoir layer comprising a fluid reservoir;

piezoelectric layer laminated to said fluid reservoir layer, said piezoelectric layer comprising a first and second fluid chamber, a first and a second through-hole connecting said first and second chambers to said reservoir, a first and second membrane forming a top to said first and second fluid chambers, and a plurality of piezoelectric elements forming a first and a second set of elements with said first set being affixed to said first membrane and said second set being affixed to said second membrane;

a liquid metal channel layer laminated to said piezoelectric layer, said channel layer comprising a liquid metal channel, a first via connecting said channel to the first of said chambers, a second via connecting said channel to the second of said chambers, a first, second and third contact pad equally separated from each other, each of said contact pads having at least a portion within the chamber and a moveable conductive liquid within the channel, a first portion of the liquid being wetted to the first of said of contact pads and a portion of the liquid wetted to both the second and third of said contact pads;

wherein said chambers and said channel are filled with a fluid and wherein said portion of the liquid wetted to said second and third of said contact pads is moveable toward said portion wetted to the first of said contact pads.

17. The piezoelectric relay of claim 16, wherein each of said first set of piezoelectric elements comprises at least two bending mode piezoelectric elements and said second set of piezoelectric elements comprises at least two bending mode piezoelectric elements.

18. The piezoelectric activated relay of claim 17 wherein said fluid reservoir comprises a single compartment.

19. The piezoelectric activated relay of claim 17 wherein said fluid reservoir comprises a plurality of compartments wherein each of said plurality of compartments has compliant walls.

20. The piezoelectric activated relay of claim 19, further comprising at least one relief port connecting each of said plurality of compartments with adjacent compartments.

21. The piezoelectric activated relay of claim 18 wherein said liquid metal is mercury.

22. The piezoelectric activated relay of claim 20 wherein said liquid metal is an alloy containing gallium.

23. The piezoelectric activated relay of claim 18 wherein said liquid metal is mercury.

24. The piezoelectric activated relay of claim 20 wherein said liquid metal is an alloy containing gallium.

25. The piezoelectric activated relay of claim 21 wherein said membrane is metal.

26. The piezoelectric activated relay of claim 23 wherein said membrane is a polymer.

27. The piezoelectric activated relay of claim 25 wherein said reservoir layer further comprises a fill port.

28. The piezoelectric activated relay of claim 26 wherein said reservoir layer further comprises a fill port.

* * * * *